(12) United States Patent
Abouelwafa et al.

(10) Patent No.: US 11,720,274 B2
(45) Date of Patent: Aug. 8, 2023

(54) DATA MIGRATION USING CACHE STATE CHANGE

(71) Applicant: HEWLETT PACKARD ENTERPRISE DEVELOPMENT LP, Houston, TX (US)

(72) Inventors: Ayman Abouelwafa, Folsom, CA (US); Murali Vaddagiri, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/166,009

(22) Filed: Feb. 3, 2021

(65) Prior Publication Data
US 2022/0244876 A1 Aug. 4, 2022

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/065* (2013.01); *G06F 3/067* (2013.01); *G06F 3/0629* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,835,954 A | 11/1998 | Duyanovich et al. | |
| 6,108,748 A | 8/2000 | Ofek et al. | |
| 6,823,349 B1 | 11/2004 | Taylor et al. | |
| 7,024,527 B1 | 4/2006 | Ohr | |
| 7,143,308 B2 | 11/2006 | Tseng et al. | |
| 7,305,579 B2 | 12/2007 | Williams | |
| 7,546,485 B2 | 6/2009 | Cochran et al. | |
| 8,112,665 B1 | 2/2012 | Somavarapu et al. | |
| 8,200,921 B2 | 6/2012 | Cochran et al. | |
| 8,214,612 B1 | 7/2012 | Natanzon | |
| 8,225,138 B2 | 7/2012 | Oxrieder et al. | |
| 8,655,848 B1 | 2/2014 | Leverett et al. | |
| 8,904,133 B1 | 12/2014 | Kono et al. | |
| 9,026,696 B1 | 5/2015 | Natanzon et al. | |
| 9,459,804 B1 | 10/2016 | Natanzon et al. | |
| 9,639,277 B2 | 5/2017 | Nakajima | |
| 10,228,962 B2 | 3/2019 | Dornemann et al. | |
| 10,241,712 B1 | 3/2019 | Elliott et al. | |
| 10,353,640 B2 | 7/2019 | Venkat et al. | |

(Continued)

OTHER PUBLICATIONS

Linux, Asymmetric Logical Unit Assignment, The Linux SCSI Target Wiki last modified on Oct. 9, 2013 (6 pages).

(Continued)

*Primary Examiner* — Midys Rojas
(74) *Attorney, Agent, or Firm* — Trop, Pruner & Hu, P.C.

(57) ABSTRACT

In some examples, for migrating data from a first storage system to a second storage system, a system creates a proxy at the first storage system to direct write requests received at the first storage system to the second storage system, initially sets a cache in the first storage system to a first state in which the cache stores write data for first write requests, and changes a state of the cache from the first state to a second state in which write data for second write requests bypasses the cache and are directed by the proxy to the second storage system.

20 Claims, 6 Drawing Sheets

(56) References Cited

U.S. PATENT DOCUMENTS

| | | | |
|---|---|---|---|
| 10,402,113 B2* | 9/2019 | Ray | G06F 3/0619 |
| 10,452,503 B2 | 10/2019 | Abouelwafa et al. | |
| 10,705,927 B2 | 7/2020 | Killamsetti et al. | |
| 10,768,851 B2 | 9/2020 | Vokaliga et al. | |
| 10,776,224 B2 | 9/2020 | Chen et al. | |
| 10,956,079 B2 | 3/2021 | Killamsetti et al. | |
| 10,972,335 B2 | 4/2021 | Rajvaidya et al. | |
| 2004/0260873 A1 | 12/2004 | Watanabe | |
| 2005/0071708 A1 | 3/2005 | Bartfai et al. | |
| 2005/0193180 A1 | 9/2005 | Fujibayashi | |
| 2010/0017573 A1 | 1/2010 | Shinozaki et al. | |
| 2011/0238937 A1 | 9/2011 | Murotani et al. | |
| 2012/0278567 A1 | 11/2012 | Broido et al. | |
| 2013/0042082 A1 | 2/2013 | Tamura et al. | |
| 2017/0132095 A1 | 5/2017 | Graefe | |
| 2018/0032257 A1 | 2/2018 | Xiang et al. | |
| 2019/0065382 A1* | 2/2019 | Velayuthaperumal | G06F 3/065 |
| 2019/0349427 A1 | 11/2019 | Rago et al. | |
| 2020/0183601 A1 | 6/2020 | Tamma et al. | |
| 2021/0026673 A1* | 1/2021 | Forney | H04L 67/1031 |
| 2021/0026867 A1 | 1/2021 | Meiri et al. | |
| 2021/0109827 A1 | 4/2021 | Vokaliga et al. | |
| 2021/0357132 A1 | 11/2021 | Kumar et al. | |
| 2021/0374155 A1 | 12/2021 | Xiang et al. | |

OTHER PUBLICATIONS

OpenStack Docs; "Dell EMC VNX driver"; printed on: Oct. 23, 2020 from webpage: https://docs.openstack.org/cinder/queens/configuration/block-storage/drivers/dell-emc-vnx-driver.html; 22 pages.

Dell; "Dell EMC Unity: Replication Technologies"; Jan. 2021; 80 pages.

George P, et al., "Bitmap and delta sync," 2015, myZerto (website), <https://www.zerto.com/myzerto/forums/topic/bitmap-and-delta-sync/> (2 pages).

IBM; "Metro Mirror and Global Mirror"; printed on Apr. 29, 2021 from webpage: https://www.ibm.com/docs/en/flashsystem-9x00/8.3.1?topic=csf-metro-miror-global-mirror, 5 pages.

Infinidal.com; "Replication Overview"; printed on Apr. 29, 2021 from webpage: https://support.infinidat.com/hc/en-us/articles/360002108377-Overview-of-replication; 15 pages.

Warmuth et al., "DS8870 Data Migration Techniques", RedBooks, IBM, First Edition, Apr. 2015, 80 pages.

Zerto Ltd., "VPG Statuses and Synchronization Triggers," Excerpt from Zerto Virtual Manager Administration Guide: VMware vSphere Environment. Chapter 9: Managing VPGS, 2015. pp. 1-2, 156-161, <https://www.zerto.com/myzerto/wp-content/uploads/2015/10/Zerto-Virtual-Manager-vSphere-Administration-Guide.pdf>.

INFINIDAT, "Active-Active replication—INFINIDAT Support," Feb. 27, 2021, <https://web.archive.org/web/20210227025847/https://support.infinidat.com/hc/en-us/articles/360002108357>.

* cited by examiner

DATA MIGRATION USING CACHE STATE CHANGE

BACKGROUND

A storage system is used to store data for a computing device or multiple computing devices. In some examples, the storage system can be directly connected to a computing device. In other examples, the storage system is accessible over a network by a computing device.

BRIEF DESCRIPTION OF THE DRAWINGS

Some implementations of the present disclosure are described with respect to the following figures.

Figure 1:
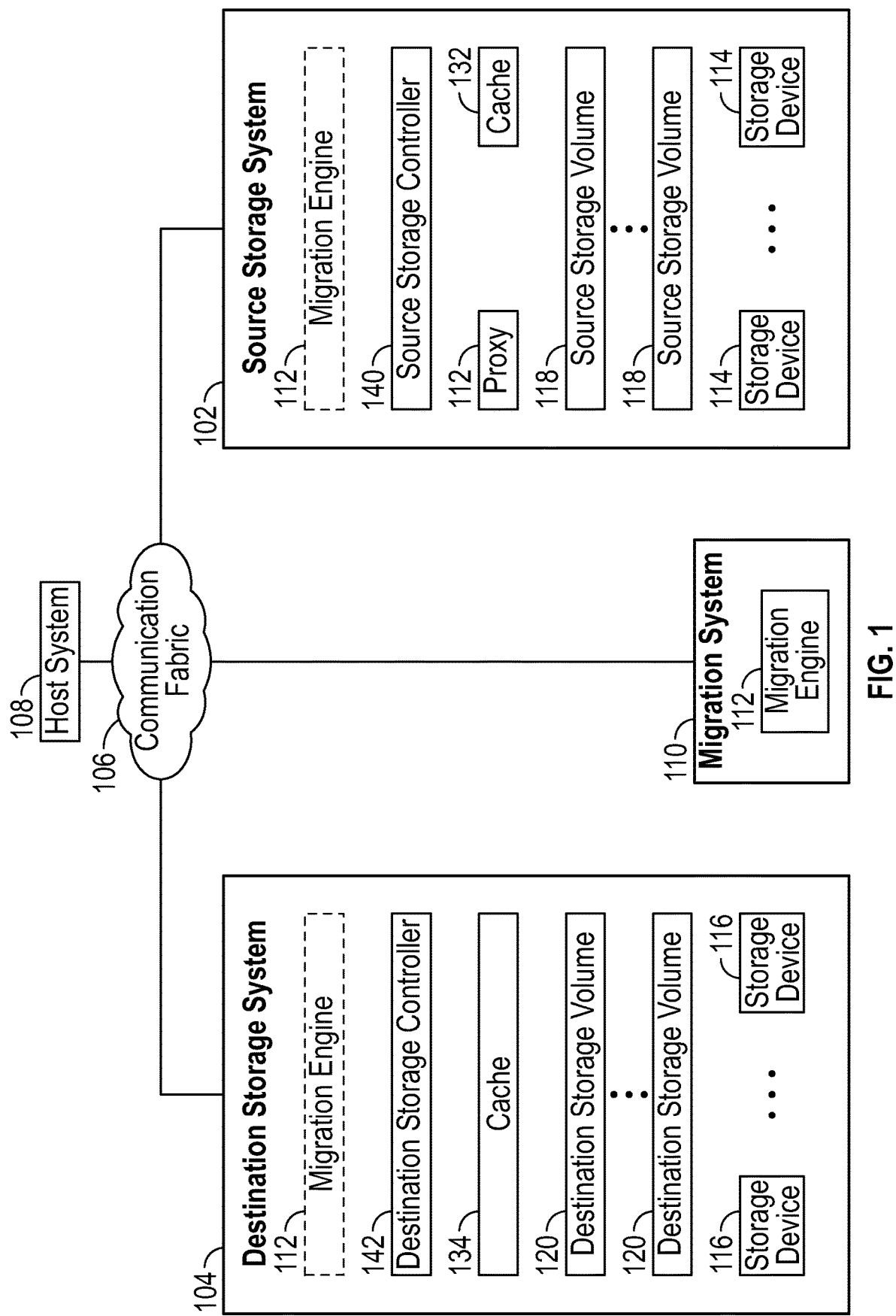
FIG. 1 is a block diagram of an arrangement to migrate data between storage systems, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Migration of data between different storage systems can be performed for various purposes. In some examples, migration of data can refer to copying data from a first storage system to a second storage system, in which a copy of the data is kept at the first storage system. Alternatively, migration of data can refer to moving data from the first storage system to the second storage system, in which the data is not kept at the first storage system.

A storage system can include a storage device or a collection of multiple storage devices. Examples of storage devices include disk-based storage devices, solid-state storage devices, and so forth.

Data can be migrated from a first storage system to a second storage system in any of the following scenarios: as part of upgrading an existing storage system to a different (e.g., higher performance) storage system, which may of a model or type that is incompatible with the existing storage system (whether from the same or different manufacturer), to move data to a target location (e.g., a location that is physically closer to computing device(s) that is (are) to use the data, a location that is more secure than a prior location, etc.), or for any other purpose.

In some cases, data can be stored in a collection of storage volumes. A "storage volume" can refer to a logical container of data, where the storage volume can be stored in a storage device or across multiple storage devices. In some examples, a storage volume can be identified as by a logical unit number (LUN) or another type of identifier.

In some examples, online data migration can be performed, in which host systems can continue to issue input/output (I/O) requests to access data in a storage volume that is being migrated from a source storage system to a destination storage system. An I/O request issued by a host system can request a read access of data and/or writing of data. A "host system" can refer to any electronic device that is able to read and/or write data. Examples of electronic devices include any or some combination of the following: a supercomputer, a desktop computer, a notebook computer, a tablet computer, a server computer, a storage controller, a communication node, a smart phone, a game appliance, a vehicle, a controller in a vehicle, a household appliance, and so forth.

In some examples, host I/O requests that are submitted during data migration may be processed by an intermediate layer (including machine-readable instructions and/or hardware processing circuitry) that may add substantial latency to the I/O requests. Latency of an I/O request can refer to an amount of time that is involved in processing the I/O request and performing an action requested by the I/O request, where the action can include returning data to the requesting host system for a read or writing data to a storage system for a write.

Due to the possibility of slowing down I/O requests during data migration, some systems may attempt to schedule data migrations during off-peak periods, i.e., periods of time during which I/O activity to a storage system is expected to be lower than other time periods.

However, in some computing environments, there may be no off-peak periods, since data in storage systems may be continually accessed 24 hours a day and 7 days a week. In such cases, when data migrations are being performed, host systems may experience a slowdown in processing of I/O requests.

In accordance with some implementations of the present disclosure, centralized cache-assisted, proxy bypass migration techniques or mechanisms are provided in which a proxy in a source storage system redirects write requests received from a number of host systems (e.g., one host system or multiple host systems) to a destination storage system (such that the source storage system is effectively bypassed), and in which a cache in the source storage system changes state to complete the migration.

A "proxy" can refer to any entity that supports the redirecting or forwarding of data access received by the proxy to another endpoint, such as the destination storage system. The proxy can be implemented using any combination of a data structure, machine-readable instructions, and hardware.

The centralized cache-assisted, proxy bypass migration technique or mechanism employs caching throughout an entire duration of the migration. The cache-assisted, proxy bypass migration technique or mechanism can perform the data migration with no impact or reduced adverse impact on host I/O performance. In other words, a host system experiences relatively low impact on latency associated with I/O requests issued by the host system during the migration. The caching used throughout the entire duration of the migration includes using a cache at the source storage system for read and write caching (when the cache is set to a first state) during the migration, and using a cache at the destination storage system when read and write caching when the cache at the source storage system is transitioned to a second state (details of the first and second states of the cache in the source storage system are discussed further below). The cache-assisted, proxy bypass migration technique is implemented using a central controller (e.g., a migration engine), which can be part of the source storage system, a destination storage system, or a system that is separate from the source and destination storage systems, or in any combination thereof.

FIG. 1 is a block diagram of an example arrangement that includes a source storage system 102 and a destination storage system 104. The labels "source" and "destination" as used in connection with the storage systems 102 and 104 assume an example in which data is to be migrated from the storage system 102 to the storage system 104. In other examples, if data is to be migrated from the storage system 104 to the storage system 102, then the storage system 104 can be referred to as a source storage system, and the storage system 102 can be referred to as a destination storage system.

The storage systems 102 and 104 are connected to a communication fabric 106, which can be implemented using any or some combination of a local area network (LAN), a wide area network (WAN), a storage area network (SAN), or any other type of network. A host system 108 is able to access the storage system 102 or 104 by issuing I/O requests to access data (read data and/or write data). The I/O requests issued by the host system 108 are transmitted over the communication fabric 106 to the storage system 102 or 104.

Although just one host system 108 is shown in FIG. 1, it is noted that in other examples, multiple host systems 108 can access the storage system 102 or 104. Also, in other examples, there can be more than two storage systems.

FIG. 1 also shows a migration system 110 that includes a migration engine 112 for migrating data from the source storage system 102 to the destination storage system 104. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the migration system 110 can be separate from the source storage system 102 and the destination storage system 104. As used here, a "system" can refer to a computing device or a collection of computing devices. In other examples, instead of implementing the migration engine 112 in the separate migration system 110, the migration engine 112 can instead be included in the source storage system 102 and/or in the destination storage system 104.

The source storage system 102 includes an array of storage devices 114, and the destination storage system 104 includes an array of storage devices 116. Although each storage system 102 or 104 is depicted with multiple storage devices, in other examples, the storage system 102 or 104 can include just one storage device.

The source storage system 102 includes source storage volumes 118. Data of the source storage volumes 118 can be stored across the array of storage devices 114. In some examples, the source storage volumes 118 can be migrated, under control of the migration engine 112, as a group as part of a data migration.

The data migration transfers the data of the source storage volumes 118 to destination storage volumes 120 in the destination storage system 104. The data of the destination storage volumes 120 is stored across the array of storage devices 116 in the destination storage system 104.

Although FIG. 1 shows an example to migrate multiple source storage volumes 118 to multiple destination storage volumes 120, in other examples, a migration can be from one source storage volume 118 to one destination storage volume 120, or from one source storage volume 118 to multiple destination storage volumes 120, or from multiple source storage volumes 118 to one destination storage volume 120.

The source storage system 102 includes a source storage controller 140, and the destination storage system 104 includes a destination storage controller 142. A storage controller manages access of the data of storage volumes in a storage system in response to commands (read commands, write commands, etc.) from a host system.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In accordance with some implementations of the present disclosure, the migration engine 112 as a centralized controller for data migration can initiate a cache-assisted, proxy bypass migration of data from the source storage system 102 to the destination storage system 104. During the cache-assisted, proxy bypass migration, the migration engine 112 causes creation of a proxy 130 at the source storage system 102 to direct write requests received from the host system 108 (or multiple host systems 108) at the source storage system 102 to the destination storage system 104.

The migration engine 112 causing creation of the proxy 130 at the source storage system 102 can include the migration engine 112 creating the proxy 130 at the source storage system 102, or the migration engine 112 requesting the source storage controller 140 of the source storage system 102 to create the proxy 130. Details of the proxy 130 are discussed further below.

The source storage system 102 includes a cache 132 that can be used to store write data for write requests. Note that the cache 132 can be used for both read caching and write caching. With read caching, data in the cache 132 can be used to satisfy a read request from the host system 108, such that retrieval of the read data from a slower storage device (e.g., the storage devices 114 and/or 116) does not have to be performed. With write caching, write data to be written to another storage device (e.g., the storage devices 114 and/or 116) can be first stored in the cache 132, for later writing to the other storage device.

A "cache" can refer to a memory that stores data that is (or will be) stored in another storage, such as the storage devices 114 of the source storage system 102 and/or the storage devices 116 of the destination storage system 104. A cache can be implemented using a number of memory devices (e.g., one memory device or multiple memory devices), including a volatile memory device such as a dynamic random access memory (DRAM) device or a static random access memory (SRAM) device, and/or a nonvolatile memory device such as a flash memory device.

The destination storage system 104 also includes a cache 134 to store write data of write requests received by the destination storage system 104 from host system(s) 108. The cache 134 in the destination storage system 104 can be used for read caching and write caching.

In accordance with some implementations of the present disclosure, to support the cache-assisted, proxy bypass migration, the cache 132 can be selectively set to multiple different states. The different states of the cache 132 include a first state in which the cache 132 stores write data for write requests, and the cache 132 can be used for read caching and write caching. The state of the cache 132 can be changed to a different second state, in which write data for write requests bypass the cache 132 and are directed by the proxy 130 to the destination storage system 104 (a write-through mode of the cache 132). Also, in the second state, the cache 132 is read invalidated, which means that data in the cache is considered invalid. The write-through mode and the read invalidated mode of the cache 132 effectively causes read and write requests to bypass the source storage system 102.

FIGS. 2A-2F illustrate an example migration process that can be initiated by the migration engine 112, according to some examples. Although FIGS. 2A-2F show an example in which one host system 108 can issue requests during the migration process, it is noted that there may be multiple host systems 108 that can issue requests during the migration process. Also, although reference is made to one source storage system 102 and one destination storage system 104, it is noted that techniques or mechanisms according to some implementations of the present disclosure can be applied to examples where there are multiple source storage systems and/or multiple destination storage systems (e.g., one-to-many migration or many-to-one migration, or many-to-many migration).

Figure 2A:
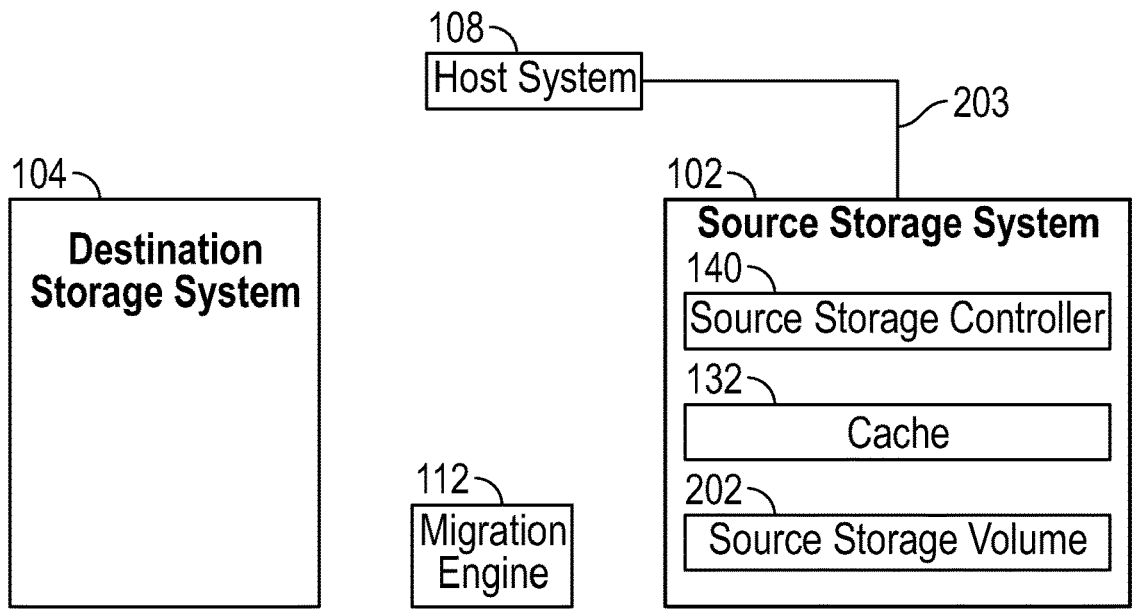
FIGS. 2A-2F are block diagrams illustrating a data migration process according to some examples.

Initially, as shown in FIG. 2A, after the migration is initiated by the migration engine 112, the source storage system 102 continues to present a source storage volume 202 to the host system 108. The host system 108 is able to access data of the storage volume 202 stored in the source storage system 102 using commands according to a storage interface protocol sent over a source path 203 between the host system 108 and the source storage system 102.

A path between a host system and a storage system can include a path through the communication fabric 106 (FIG. 1) between a port of the host system and a port of the storage system.

An example of a storage interface protocol that can be used by the host system 108 is the Small Computer System Interface (SCSI) protocol. In other examples, other storage interface protocols can be employed. A "storage interface protocol" refers to a protocol that manages the control of access of data in storage systems.

In examples where SCSI is used, Asymmetric Logical Unit Access (ALUA) may be employed to allow multipathing to a given storage volume, such as the storage volume 202. Multipathing refers to providing more than one path to a storage volume between a host system and a storage system. According to ALUA, there may be an optimized path and a non-optimized path for I/O requests to the given storage volume. A host system configured to use ALUA can apply a multipathing policy to determine which path to use to issue requests to access (read and/or write) data in the give storage volume.

ALUA allows for access to the same storage volume, such as the storage volume 202 that is to be migrated, using multiple controllers, such as storage controllers of the source storage system 102 and the destination storage system 104.

Although reference is made to ALUA in some examples, it is noted that in other examples, other techniques for defining states of paths between host systems and storage volumes can be employed.

In accordance with some examples, during the migration process, the source path 203 between the host system 108 and the source storage system 102 is an optimized path and has the ALUA active/optimized state until the source storage system 102 is decommissioned at the conclusion of the migration process. Decommissioning the source storage system 102 refers to removing the source storage system 102 from use by host systems. For example, if ALUA is used, the source storage system 102 can be decommissioned by setting the source path 203 to the ALUA unavailable state or ALUA standby state.

In FIG. 2A, read and write caching is enabled for the storage volume 202 to improve host I/O performance. Read and write caching is provided by the cache 132 in the source storage system 102. The read and write caching is enabled at the source storage system 102 for most of the migration process, until the state of the cache 132 is bypassed (discussed further below). With read and write caching enabled, requests received by the source storage controller 140 from the host system 108 can be satisfied using the cache 132.

Figure 2B:
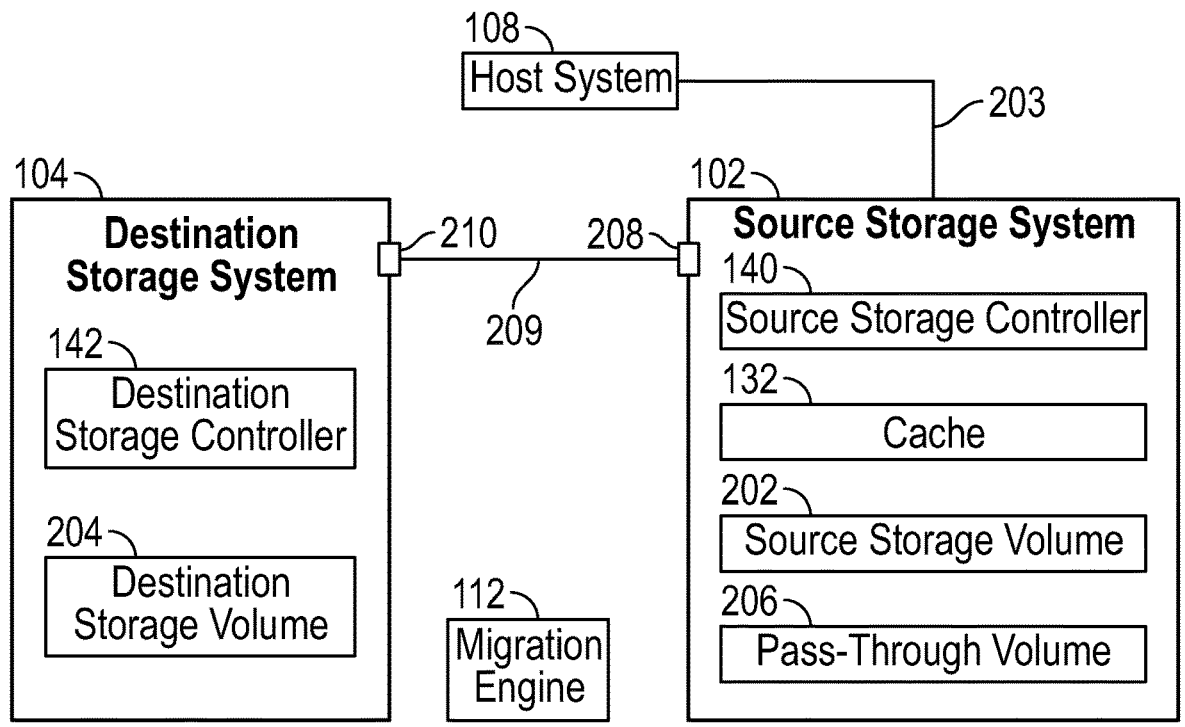

As shown in FIG. 2B, the migration engine 112 causes creation of a destination storage volume 204 in the destination storage system 104. The created destination storage volume 204 is initially empty (i.e., without data). The destination storage volume 204 is to be populated with data from the source storage volume 202 in the migration process.

The migration engine 112 or the source storage system 102 can request the destination storage system 104 to provide, to the source storage system 102, metadata of the destination storage volume 204. The metadata of the destination storage volume 204 can include a size of the destination storage volume 204, and possibly any or some combination of the following: an identifier of the destination storage volume 204, version information of the destination storage volume 204, a group identifier to identify the group that the destination storage volume 204 is part of, and so forth.

In response to the metadata received from the destination storage system 204, the migration engine 112 or the source storage system 102 creates a pass-through volume 206, which is a virtual volume that does not actually store data. Rather, the pass-through volume 206 is used as a proxy (e.g., the proxy 130 of FIG. 1) to mirror data of the source storage volume 202 to the destination storage volume 204. The creation of the pass-through volume 206 is based on the metadata of the destination storage volume 204 provided by the destination storage system 104 to the source storage system 102.

The pass-through volume 206 has similar characteristics (based on the metadata of the destination storage volume 204) to which the source storage controller 140 can direct read and write accesses. In other words, the source storage controller 140 can perform read and write accesses to the pass-through volume 206 as if the pass-through volume 206 were an actual storage volume (that has the characteristics of the destination storage volume 204). Read and write accesses directed to the pass-through volume 206 are forwarded to the destination storage system 204.

In some examples, for the purpose of passing data of the source storage volume 202 to the destination storage volume 204, the source storage controller 140 acts as an initiator and the destination storage system 104 is a target of requests issued by the initiator. For example, the source storage system 102 can include a host I/O port 208, and the destination storage system 104 can include a target I/O port 210. The I/O ports 208 and 210 can include Fibre Channel (FC) ports that operate according to the FC protocol. A link 209 between the I/O ports 208 and 210 can be provided over the communication fabric 106 of FIG. 1, for example.

The FC protocol provides for a relatively high speed transfer of data across a network. In examples where FC is used, the source storage controller 140 can be an FC initiator, and the destination storage system 104 can be an FC target.

In other examples, other protocols can be employed to perform transfer of data from the source storage system 102 to the destination storage system 104.

In the state of the migration process depicted in FIG. 2B, the source storage controller 140 continues to receive host I/O requests from the host system 108. Also, the source path 203 continues to be in an active state (e.g., ALUA active/optimized state), and the cache 132 is in the state in which read and write caching is enabled.

Figure 2C:
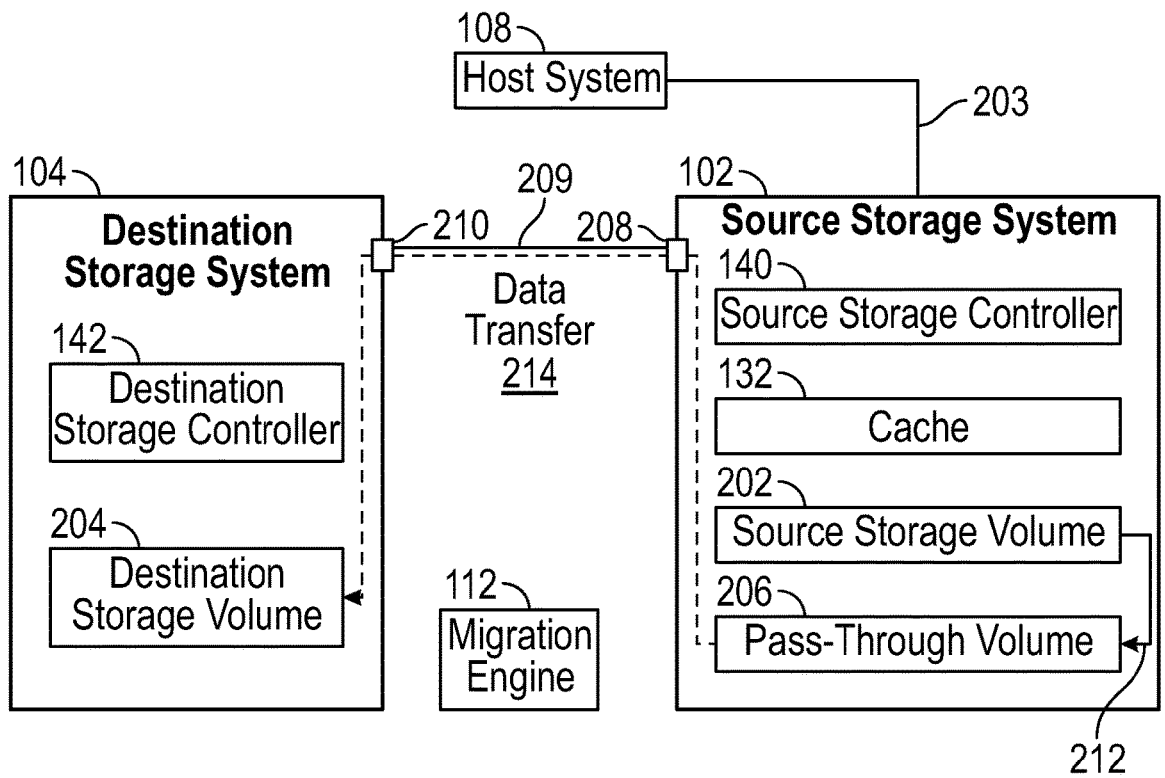

As shown in FIG. 2C, while the source storage controller 140 continues to accept host I/O requests, including write requests in which write data is written into the cache 132 in the source storage system 102, the source storage controller 140 initiates data mirroring (212 from the source storage volume 202 to the pass-through volume 206). The data mirroring (212) can be performed as a background process in some examples. Note that the data of the source storage volume 202 being mirrored includes data in the source storage volume 202 as well as write data in the cache 132 of the source storage system 102.

Performing data mirroring (212) from the source storage volume 202 (and the cache 132) to the pass-through volume 206 causes the corresponding data to be transferred (214) to the destination storage volume 204 between the source I/O port 208 and the target I/O port 210. If FC is employed, then the data being transferred from the source storage system 102 to the destination storage system 104 through the ports 208 and 210 is from an FC initiator to an FC target.

Note that the data mirroring (212), which can be a background process, does not have any significant adverse impact on the host I/O performance of host I/O requests received by the source storage system 102 from the host system 108. In other words, the source storage controller 140 can continue to process the host I/O requests while, in the background, the data mirroring (212) proceeds to transfer the data to the destination storage volume 204.

In the state of the migration process depicted in FIG. 2C, the source path 203 continues to be in an active state (e.g., ALUA active/optimized state), and the cache 132 is in the state in which read and write caching is enabled.

Figure 2D:
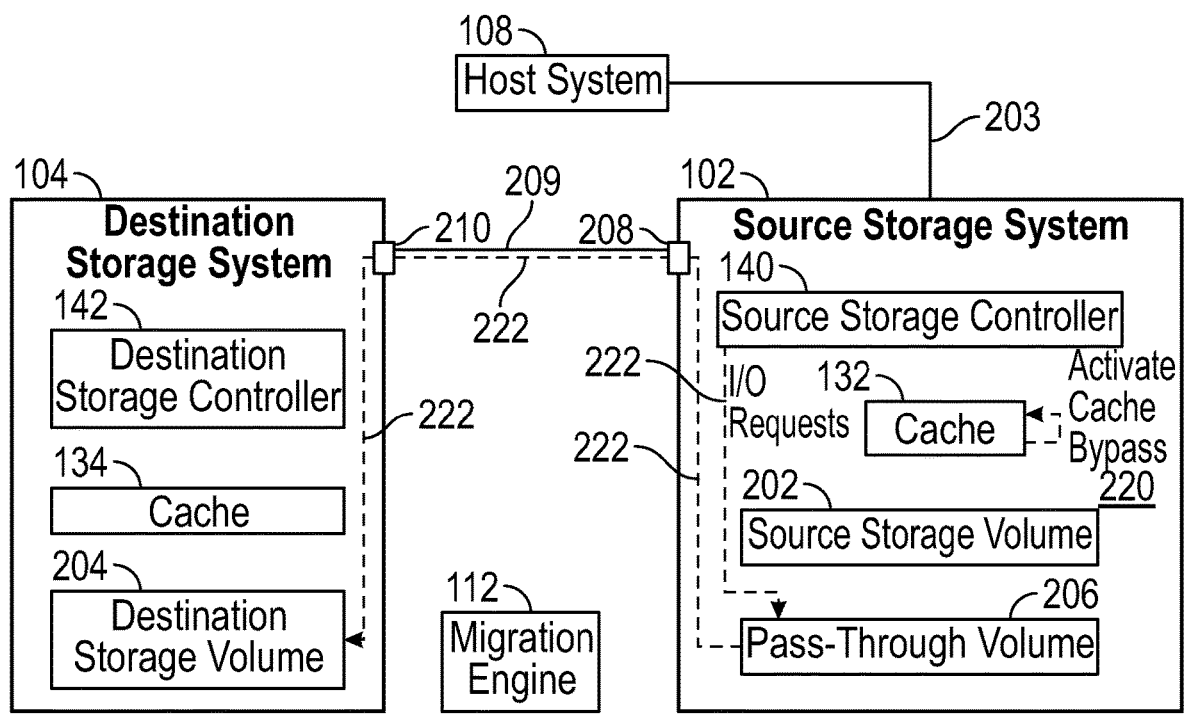

As shown in FIG. 2D, once the data mirroring (212) from the source storage volume 202 to the destination storage volume 204 (via the pass-through volume 206) is complete, the migration engine 112 or the source storage controller 140 activates a cache bypass state (220) according to some implementations of the present disclosure. In the cache bypass state (220), the cache 132 in the source storage system 102 is transitioned to a write-through mode, in which any writes received by the source storage controller 140 is written to the pass-through volume 206 instead of into the cache 132. Also, read invalidation is performed to invalidate the data of the cache 132, so that any subsequent read requests received by the source storage controller 140 cannot be satisfied from the cache 132 in the source storage system 102, but instead, would have to be retrieved from the destination storage volume 204 in the destination storage system 104. Effectively, when cache bypass is activated, host I/O requests are forwarded (222) by the source storage controller 140 to the destination storage system 104 through the pass-through volume 206.

While the cache bypass state (220) is activated, there may be a slight host I/O performance degradation while a new path from the host system 108 to the destination storage system 104 is being set up. Note, however, that since the destination storage system 104 also includes the cache 134 that provides read caching and write caching, host I/O requests received by the source storage controller 140 can be satisfied from the cache 134 in the destination storage system 104. As a result, the amount of I/O performance degradation may not be significant (e.g., the host I/O performance may drop less than 5%, or 10%, or 20%, etc., as compared to a state where the cache 132 supports read caching and write caching). By activating the cache bypass state (220) in the source storage system 102, one layer of caching is removed (at the source storage system 104), while another layer of caching (at the destination storage system 104) remains available.

In the cache bypass state (220), the source storage system 102 effectively behaves as a switch, which can add a small amount of latency as host I/O requests are forwarded between the host system 108 and the destination storage system 104 through the source storage system 102.

In the state of the migration process depicted in FIG. 2D, the source path 203 continues to be in an active state (e.g., ALUA active/optimized state).

Figure 2E:
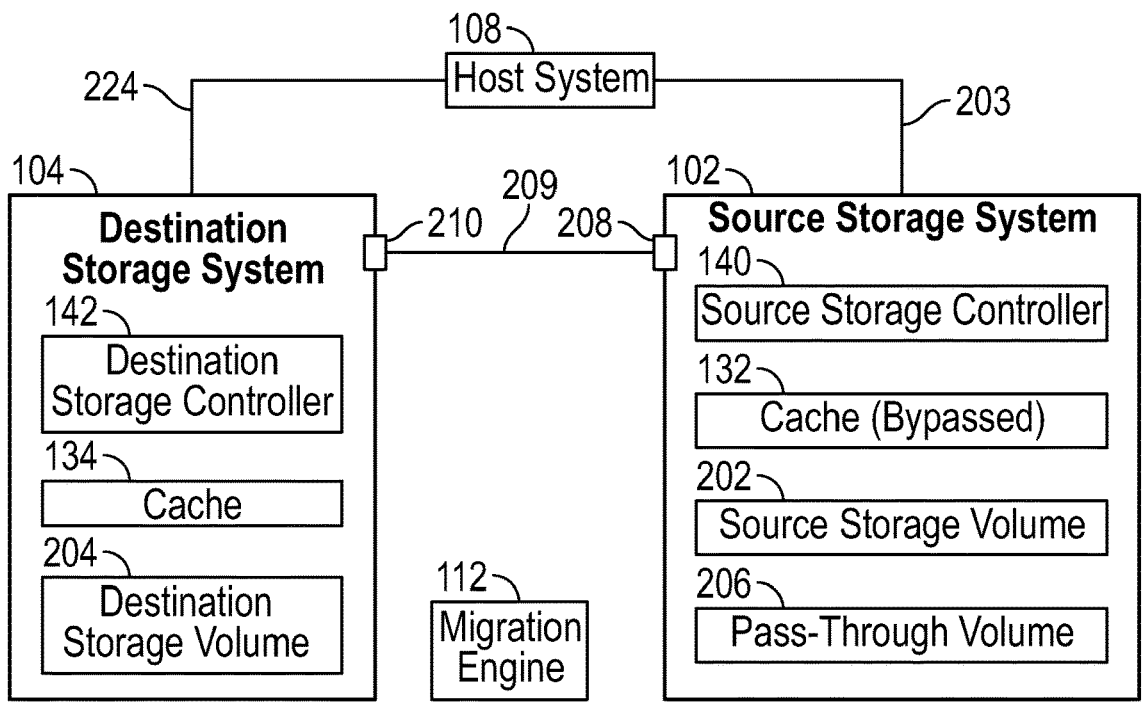

As shown in FIG. 2E, the migration engine 112 causes establishment of a destination path 224 between the host system 108 and the destination storage system 104. The migration engine 112 can cause establishment of the destination path 224 by directly establishing the destination path 224 or requesting that the destination storage controller 142 establish the destination path 224. The destination path 224 can be set to an active state (e.g., the ALUA active/optimized state in examples where SCSI is employed).

Once the destination path 224 is presented to the host system 108, the host system 108 can discover the destination path 224. In the state of the migration process shown in FIG. 2E, the host system 108 can send I/O requests across the source path 203 and the destination path 224. Note that the host system 108 may employ a host multipathing policy that controls which of the source path 203 and the destination path 224 to use.

Since multipathing is enabled in the state shown in FIG. 2E, host I/O performance can increase since I/O requests of the host system 108 to be satisfied over multiple paths.

Figure 2F:
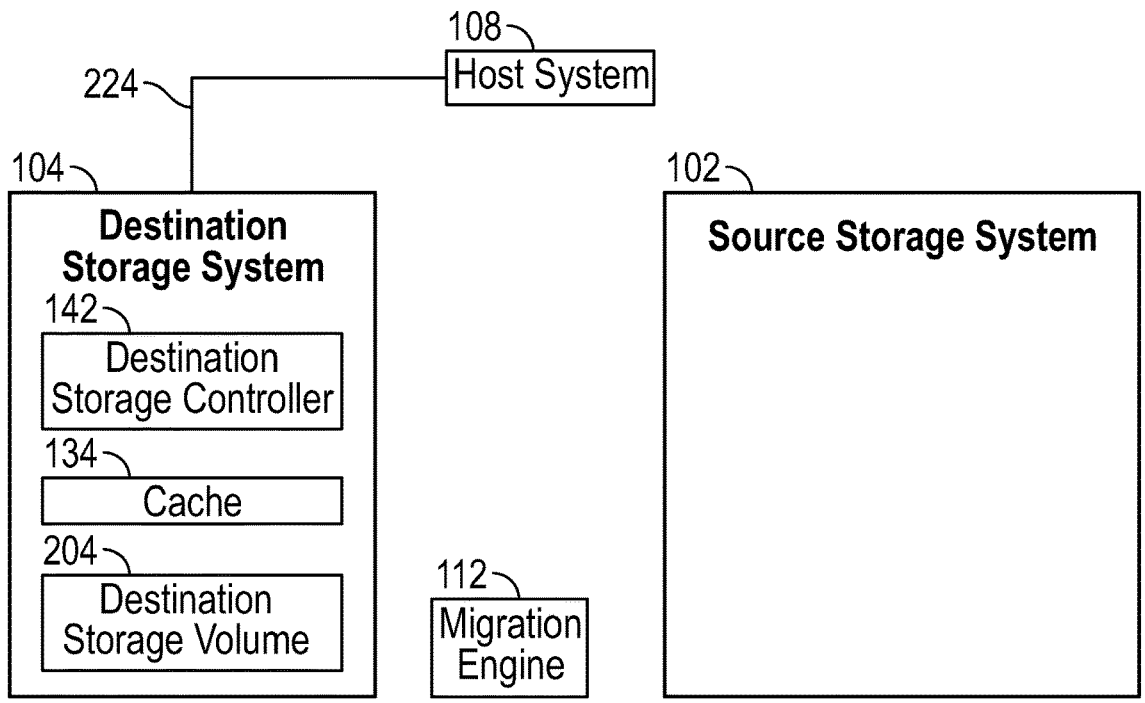

Next, as shown in FIG. 2F, the migration engine 112 removes the source path 203 to decommission the source storage system 102. The source path 203 is removed by setting the source path 203 to an inactive state (e.g., ALUA unavailable or standby state).

In the state shown in FIG. 2E, I/O requests are issued by the host system 108 across the destination path 224 to the destination storage volume 204.

Using techniques or mechanisms according to some implementations of the present disclosure, host I/O handling during a migration process is improved since host I/O requests do not have to go through additional layers (including software or hardware layers), which reduces latency associated with the I/O requests. By defining both the source path and the destination path as being active near the end of the migration process, a relatively simple technique is provided to allow the source path to be removed and to switch over to the destination path. No changes to machine-readable instructions have to be performed at the destination storage system 104, unless the migration engine 112 is implemented at the destination storage system 104. Also, the machine-readable instructions of the host system 108 do not have to be changed to support the migration process according to some implementations of the present disclosure.

Figure 3:
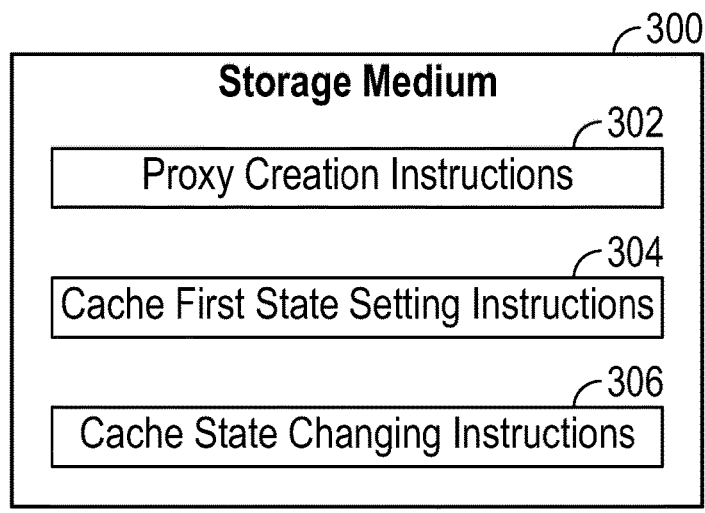
FIG. 3 is a block diagram of a storage medium storing machine-readable instructions according to some examples.

FIG. 3 is a block diagram of non-transitory machine-readable or computer-readable storage medium 300 storing machine-readable instructions that upon execution cause a system to perform various tasks. The "system" can include any or some combination of the migration system 110, the source storage system 102, and the destination storage system 104.

For migrating data from the source storage system 102 to destination storage system 104, the machine-readable instructions are executable to perform a cache-assisted, proxy bypass migration.

The machine-readable instructions include proxy creation instructions 302 to create a proxy (e.g., the pass-through volume 206 of FIGS. 2B-2E) at the source storage system 102 to direct I/O requests (including read requests and/or write requests) received at the source storage system 102 to the destination storage system 104. The I/O requests are from a number (one or greater than one) of host systems.

The machine-readable instructions include cache first state setting instructions 304 to initially set a cache in the source storage system 102 to a first state in which read caching and write caching are enabled (e.g., the cache stores write data for write requests and can be used to respond to read requests).

The machine-readable instructions include cache state changing instructions 306 to change a state of the cache from the first state to a second state in which the cache is set to a cache bypass state, in which I/O requests (write requests and/or read requests) from the host system bypass the cache and are directed by the proxy to the destination storage system 104.

In some examples, the migration of the data from the source storage system 102 to the destination storage system 104 is a centralized cache-assisted, proxy bypass migration managed by a central controller in which read and write caching is enabled to serve I/O requests from host systems during a duration of the migration, such that the I/O requests experience a negligible amount of increased latency during the migration.

In some examples, the second state of the cache is based on setting the cache to a write-through mode and invalidating data of the cache. Invalidating the data of the cache enforces serving of read requests from the destination storage system 104 through the proxy.

In some examples, the machine-readable instructions are executable to cause creation of a destination storage volume at the destination storage system 104, where the destination storage volume is to receive the data to be migrated.

In some examples, the machine-readable instructions are executable to receive metadata of the destination storage volume, and create the pass-through volume based on the metadata.

In some examples, the machine-readable instructions are executable to initiate mirroring of data from a source storage volume in the source storage system 102 to the pass-through volume, to transfer the data from the source storage volume to the destination storage volume in the destination storage system 104.

In some examples, the changing of the state of the cache occurs after completion of the mirroring of the data from the source storage volume to the destination storage volume.

Figure 4:
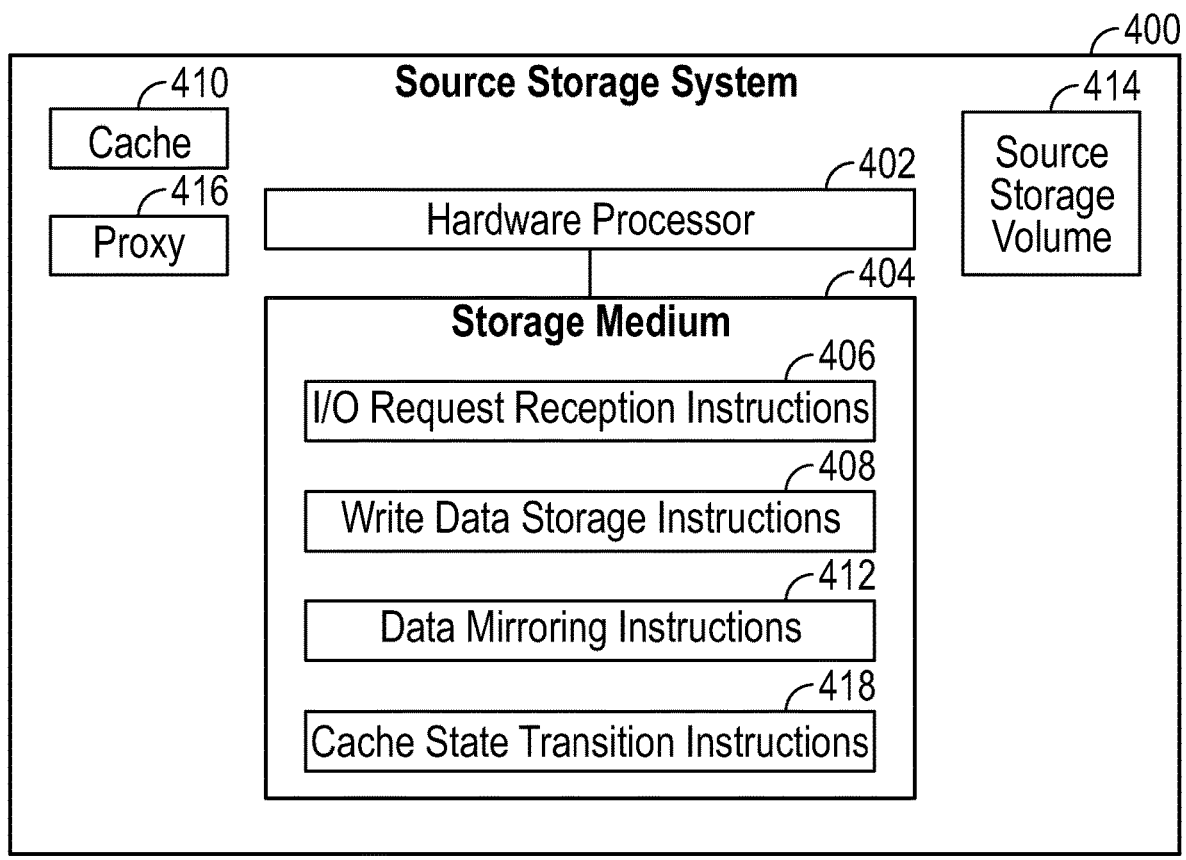
FIG. 4 is a block diagram of a source storage system according to some examples.

FIG. 4 is a block diagram of a source storage system 400 that includes a hardware processor (or multiple hardware processors) 402. A hardware processor can include a microprocessor, a core of a multi-core microprocessor, a microcontroller, a programmable integrated circuit, a programmable gate array, or another hardware processing circuit.

The source storage system 400 includes a storage medium 404 storing machine-readable instructions executable on the hardware processor 402 to perform various tasks during a migration process to migrate data from the source storage system 400 to a destination storage system. Machine-readable instructions executable on the hardware processor 402 can refer to the machine-readable instructions executable on a single hardware processor or multiple hardware processors.

The machine-readable instructions in the storage medium 404 include I/O request reception instructions 406 to receive I/O requests from a host system at the source storage system 400.

The machine-readable instructions include write data storing instructions 408 to store write data of write requests in a cache 410 enabled for write caching. The cache 410 is in the source storage system 400.

The machine-readable instructions include data mirroring instructions 412 to perform data mirroring from a source storage volume 414 to a proxy 416 for a destination storage volume in the destination storage system, where the data mirroring includes copying of data from the source storage volume 414 and the cache 410 to the proxy 416.

The machine-readable instructions include cache state transition instructions 418 to, after completing the data mirroring, transition the cache 410 to a cache bypass state in which I/O requests bypass the cache 410 and are directed through the proxy 416 to the destination storage system.

Figure 5:
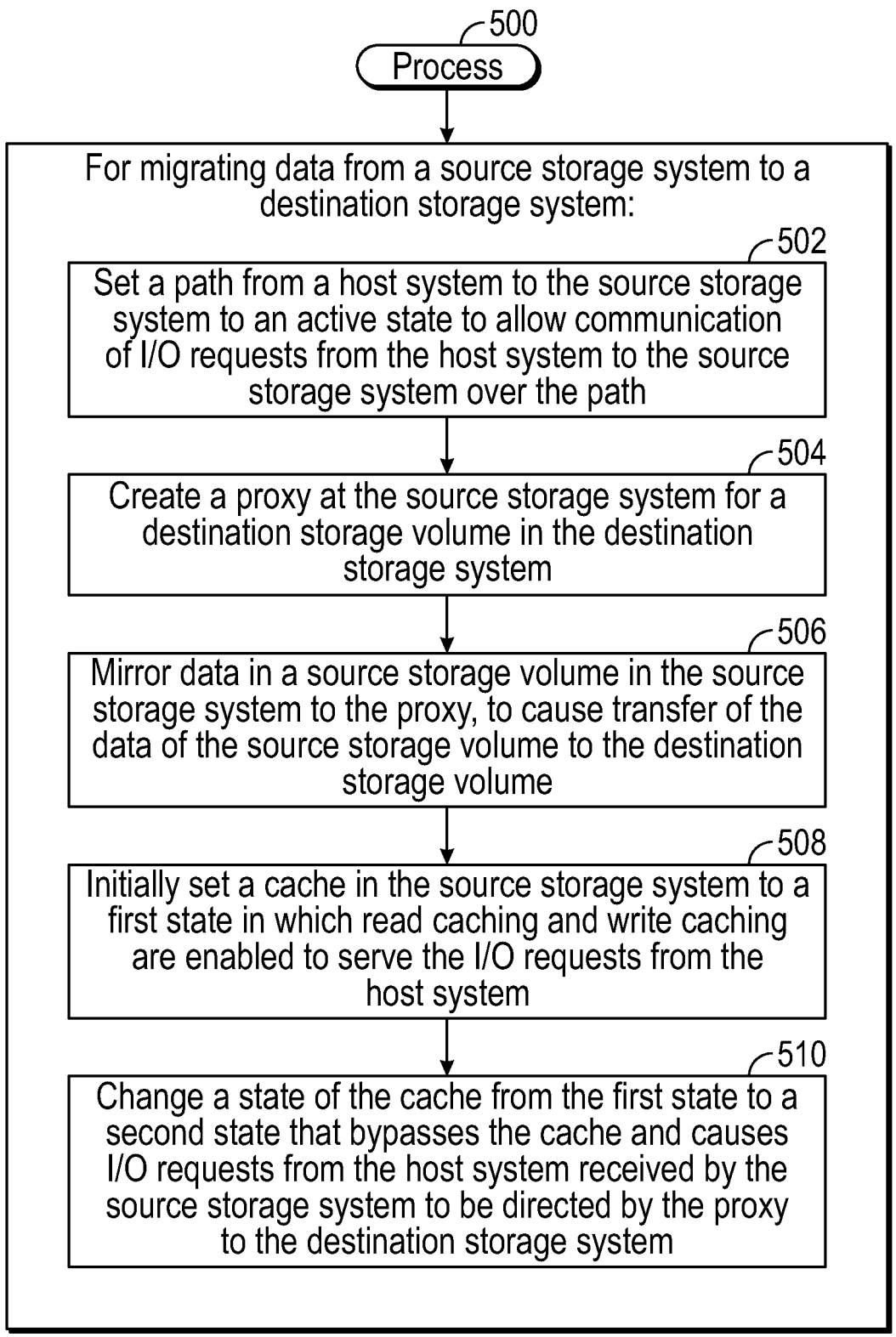
FIG. 5 is a flow diagram of a process according to some examples.

FIG. 5 is a flow diagram of a process 500, which can be performed by a system such as any or some combination of the migration system 110, the source storage system 102, and the destination storage system 104.

The process 500 includes various tasks for migrating data from a source storage system to a destination storage system.

The process 500 includes setting (at 502) a path from a host system to the source storage system to an active state to allow communication of I/O requests from the host system to the source storage system over the path.

The process 500 includes creating (at 504) a proxy at the source storage system for a destination storage volume in the destination storage system.

The process 500 includes mirroring (at 506) data in a source storage volume in the source storage system to the proxy, to cause transfer of the data of the source storage volume to the destination storage volume.

The process 500 includes initially setting (at 508) a cache in the source storage system to a first state in which read caching and write caching are enabled to serve the I/O requests from the host system.

The process 500 includes changing (at 510) a state of the cache from the first state to a second state in which that bypasses the cache and causes I/O requests from the host system received by the source storage system to be directed by the proxy to the destination storage system.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of nonvolatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
for migrating data from a source storage system to a destination storage system:
create a proxy at the source storage system to direct write requests received at the source storage system to the destination storage system;
initially, while mirroring of the data from the source storage system to the destination storage system is performed, set a cache in the source storage system to a cache enabled state in which the cache stores write data for first write requests; and
in response to completion of the mirroring of the data from the source storage system to the destination storage system, change a state of the cache in the source storage system from the cache enabled state to a cache bypass state in which write data for second write requests received at the source storage system bypasses the cache and are directed by the proxy at the source storage system to the destination storage system.

2. The non-transitory machine-readable storage medium of claim 1, wherein the migrating of the data from the source storage system to the destination storage system is a centralized cache-assisted, proxy bypass migration managed by a central controller in which read and write caching is enabled to serve input/output (I/O) requests from host systems during a duration of the migrating.

3. The non-transitory machine-readable storage medium of claim 1, wherein the cache bypass state is a write-through mode of the cache.

4. The non-transitory machine-readable storage medium of claim 3, wherein the instructions upon execution cause the system to set the cache in the cache bypass state by further invalidating data of the cache to enforce serving of read requests from the destination storage system through the proxy in the source storage system.

5. The non-transitory machine-readable storage medium of claim 1, wherein in the cache enabled state the cache is enabled for read caching and write caching.

6. The non-transitory machine-readable storage medium of claim 1, wherein the first write requests and the second write requests are received from a number of host systems during the migrating of the data.

7. The non-transitory machine-readable storage medium of claim 1, wherein the instructions upon execution cause the system to:
cause creation of a destination storage volume at the destination storage system, the destination storage volume to receive the data to be migrated; and
create the proxy based on creating a pass-through volume at the source storage system.

8. The non-transitory machine-readable storage medium of claim 7, wherein the instructions upon execution cause the system to:
receive metadata of the destination storage volume; and
create the pass-through volume based on the metadata.

9. The non-transitory machine-readable storage medium of claim 7, wherein the instructions upon execution cause the system to:
initiate the mirroring of the data from a source storage volume in the source storage system to the pass-through volume, to transfer data from the source storage volume to the destination storage volume,
wherein the changing of the state of the cache occurs after completion of the mirroring of the data from the source storage volume to the destination storage volume.

10. The non-transitory machine-readable storage medium of claim 9, wherein the instructions upon execution cause the system to:
present the destination storage volume to a host system such that the host system is provided with a plurality of paths over which requests of the host system can be transmitted for data of the destination storage volume.

11. The non-transitory machine-readable storage medium of claim 10, wherein the plurality of paths comprise a first path from the host system to the source storage system, and a second path from the host system to the destination storage system.

12. The non-transitory machine-readable storage medium of claim 11, wherein the first path and the second path are both in an active state to allow access of data by the host system from the destination storage volume.

13. The non-transitory machine-readable storage medium of claim 11, wherein the instructions upon execution cause the system to:
remove the first path to decommission the source storage system.

14. The non-transitory machine-readable storage medium of claim 1, wherein the source storage system acts as an initiator to the destination storage system when directing the write requests to the destination storage system.

15. The non-transitory machine-readable storage medium of claim 1, wherein in the cache enabled state the cache provides read caching for read requests from a host system received at the source storage system, and wherein in the cache bypass state data in the cache is invalidated and read requests from the host system received at the source storage system are directed from the source storage system to the destination storage system.

16. A source storage system comprising:
a processor; and
a non-transitory storage medium storing instructions executable on the processor to, during a migration process to migrate data from the source storage system to a destination storage system:

perform data mirroring of the data from a source storage volume in the source storage system to a proxy for a destination storage volume in the destination storage system, to transfer the data to the destination storage volume from the source storage volume;

receive input/output (I/O) requests from a host system at the source storage system;

initially, while the data mirroring is performed, set a cache in the source storage system to a cache enabled state in which the cache stores write data for first write requests; and in response to completing the data mirroring, transition the cache in the source storage system from the cache enabled state to a cache bypass state in which I/O requests bypass the cache and are directed through the proxy in the source storage system to the destination storage system.

17. The source storage system of claim 16, wherein the cache bypass state is based on setting the cache to a write-through mode and invalidating data in the cache.

18. The source storage system of claim 16, wherein the proxy comprises a pass-through volume in the source storage system based on metadata of the destination storage volume.

19. A method of a system comprising a hardware processor, comprising:

to perform a migration of data from a source storage system to a destination storage system:

setting a first path from a host system to the source storage system to an active state to allow communication of input/output (I/O) requests from the host system to the source storage system over the first path;

creating a proxy at the source storage system for a destination storage volume in the destination storage system;

mirroring the data in a source storage volume in the source storage system to the proxy, to cause transfer of the data of the source storage volume to the destination storage volume;

initially, while the mirroring of the data from the source storage volume to the destination storage volume is performed, setting a cache in the source storage system to a cache enabled state in which read caching and write caching are enabled to serve the I/O requests from the host system during the migration of the data; and in response to completion of the mirroring of the data from the source storage volume to the destination storage volume, changing a state of the cache from the cache enabled state to a cache bypass state that bypasses the cache and causes I/O requests from the host system received by the source storage system to be directed by the proxy to the destination storage system.

20. The method of claim 19, further comprising:

setting a second path from the host system to the destination storage system to the active state to allow communication of I/O requests from the host system to the destination storage system over the second path; and setting the first path to an inactive state to decommission the source storage system.

* * * * *